(12) United States Patent
Fellingham et al.

(10) Patent No.: US 6,292,553 B1
(45) Date of Patent: Sep. 18, 2001

(54) METHOD AND APPARATUS FOR IP NETWORK CALL DELIVERY

(75) Inventors: Paul J. Fellingham, Holmdel; Christopher P. Gilboy, Freehold, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/082,406

(22) Filed: May 20, 1998

(51) Int. Cl.[7] ............................. H04M 7/00; H04L 12/66
(52) U.S. Cl. .................. 379/221.02; 370/356; 370/401; 379/900
(58) Field of Search ................................ 370/352, 353, 370/354, 355, 356, 401; 379/219, 220, 221, 900, 901, 220.01, 221.01, 221.02

(56) References Cited

U.S. PATENT DOCUMENTS 4,577,066 * 3/1986 Bimonte et al. ...................... 379/221

OTHER PUBLICATIONS

Now allowed Application Furman 15–1–5, filed with the US Patent Office on Dec. 23, 1997, Serial No. 08/997086 entitled, Method For Validation of Electronic Transactions.

Now allowed Application Mayer 5, filed with the US Patent Office on Jun. 23, 1995, Serial No. 08/494610 entitled, Method And Apparatus For Establishing Voice Connections Over Internet–Like Networks.

* cited by examiner

*Primary Examiner*—Harry S. Hong
(74) *Attorney, Agent, or Firm*—Robert B. Levy

(57) ABSTRACT

A calling party (12) may enjoy IP network routing of a call to a called party (14) simply by dialing the called party's number. Upon receipt of the call, a network (22) accesses a service database (24) containing call routing instructions. Each record is identified by a particular attribute of a call that may include: (1) the originating number, (2), at least a portion of the destination number, (3) a Carrier Identification Code (CIC) associated with the network originating call, and/or (4) at least one characteristic of a trunkgroup on which the network received the call. If the network matches a data base record to a call attribute, the network routes the call in accordance with the instructions in the matching record, including routing the call over an IP network 16 when the record so specifies.

10 Claims, 1 Drawing Sheet

METHOD AND APPARATUS FOR IP NETWORK CALL DELIVERY

TECHNICAL FIELD

This invention relates to a technique for routing a telephone call (voice, facsimile, or voice band data) over an Internet Protocol (IP) network based on one or more attributes associated with the call.

BACKGROUND ART

Presently, some Internet Telephony Service Providers (ITSPs) now offer "Voice over the Internet" telephony service. Subscribers of such telephony service typically initiate a telephone call for routing over the Internet by first dialing a local access number to gain access to a gateway maintained by the ITSP. After reaching the gateway, the subscriber making the call then enters the necessary verification information, such as an account number and/or Personal Identification Number (PIN), as well as the destination number of the called party. Following verification, the gateway converts the voice call received from the subscriber into an Internet Protocol (IP) call and then routes the call over the Internet to a destination gateway serving the called party. The destination gateway converts the IP call back to a voice call for routing to the called party.

The above-described method for completing voice calls over the Internet suffers from the disadvantage of requiring the calling subscriber to dial the local gateway number first, and thereafter dial the actual destination number. Such "multi-stage" dialing is inconvenient. Moreover, the need for multi-stage dialing to complete calls over the Internet necessitates manual intervention for facsimile service, and other types of calls that normally make use of single stage dialing.

Thus, there is a need for a technique for enabling a customer to enjoy voice over Internet telephony service without requiring multi-stage dialing.

BRIEF SUMMARY OF THE INVENTION

Briefly, the present invention provides Internet telephony service (i.e., the routing of voice, fax and/or voice band calls over the an IP Network) in accordance with at least one attribute associated with the call. The method of the invention commences upon receipt of a call at a network from a subscriber. Upon receipt of the call, the network accesses a database to determine if there is a record identified by at least one attribute associated with the call. If there is an associated record, the network determines whether the record contains routing instructions specifying IP Network call routing for that call, and if so, the network then routes the call over the IP Network. The term "IP network" means a network that may include the public Internet, one or more private IP networks (sometimes referred to as intranets), or any combination thereof.

The call attribute identifying the database record may comprise all or at least a portion of the originating telephone number of the calling party (as obtained by ANI). Typically, each Internet telephony subscriber will have an associated database record identified by the subscriber's telephone number that specifies IP Network routing for calls originating from that subscriber. Thus, the network accesses the record from the database by matching the subscriber's number to the record identified by that number.

Instead of the originating number, the call attribute identifying the database record could comprise all, or at least a portion of the dialed destination number of the called party. In this way, the network matches the database record by comparing all or a portion of the destination number to locate the record having such an identifier.

Alternatively, the record-identifying attribute could comprise a Carrier Identification Code (CIC) dialed either explicitly, or implicitly, by the calling party. In this way, the network matches the database record by comparing the CIC to the database record having such an identifier. Thus, based on the CIC, the network can determine from the routing instructions in the matching database record whether the call should enjoy IP Network routing.

Indeed, a predefined trunkgroup designation could be used such that all calls carried by a trunkgroup to the network are given IP Network routing. This arrangement could exist when an IXC receives calls from a business over a "private line" or dedicated trunkgroup with the intention of providing IP Network routing. In this way, the network matches the trunkgroup record by comparing the trunkgroup characteristics to the database record having such an identifier. Thus, based on the incoming trunkgroup, the network can determine from the routing instructions in the matching database record whether the call should enjoy IP Network routing.

Indeed, the call attribute may comprise a combination of any two or more of the following: (1) all or part of the originating number, (2), all or party of the destination number (3), the CIC, and (4) at least one trunkgroup characteristic. For example, the combination of a prescribed CIC and all or part of a destination number within a prescribed range of numbers could identify a corresponding record whose routing instruction would trigger routing of a call over the IP Network. Likewise, the combination of all or part of an originating number associated with an Internet telephony subscriber, and all or part of a destination number within a prescribed range of numbers could also identify a corresponding database record whose routing instruction would trigger routing of a call over the IP Network.

By determining IP network call routing in accordance with one or more call attributes, the invention achieves IP Network call routing via single stage dialing, an advantage not achieved by the prior art.

DETAILED DESCRIPTION

Figure 1:
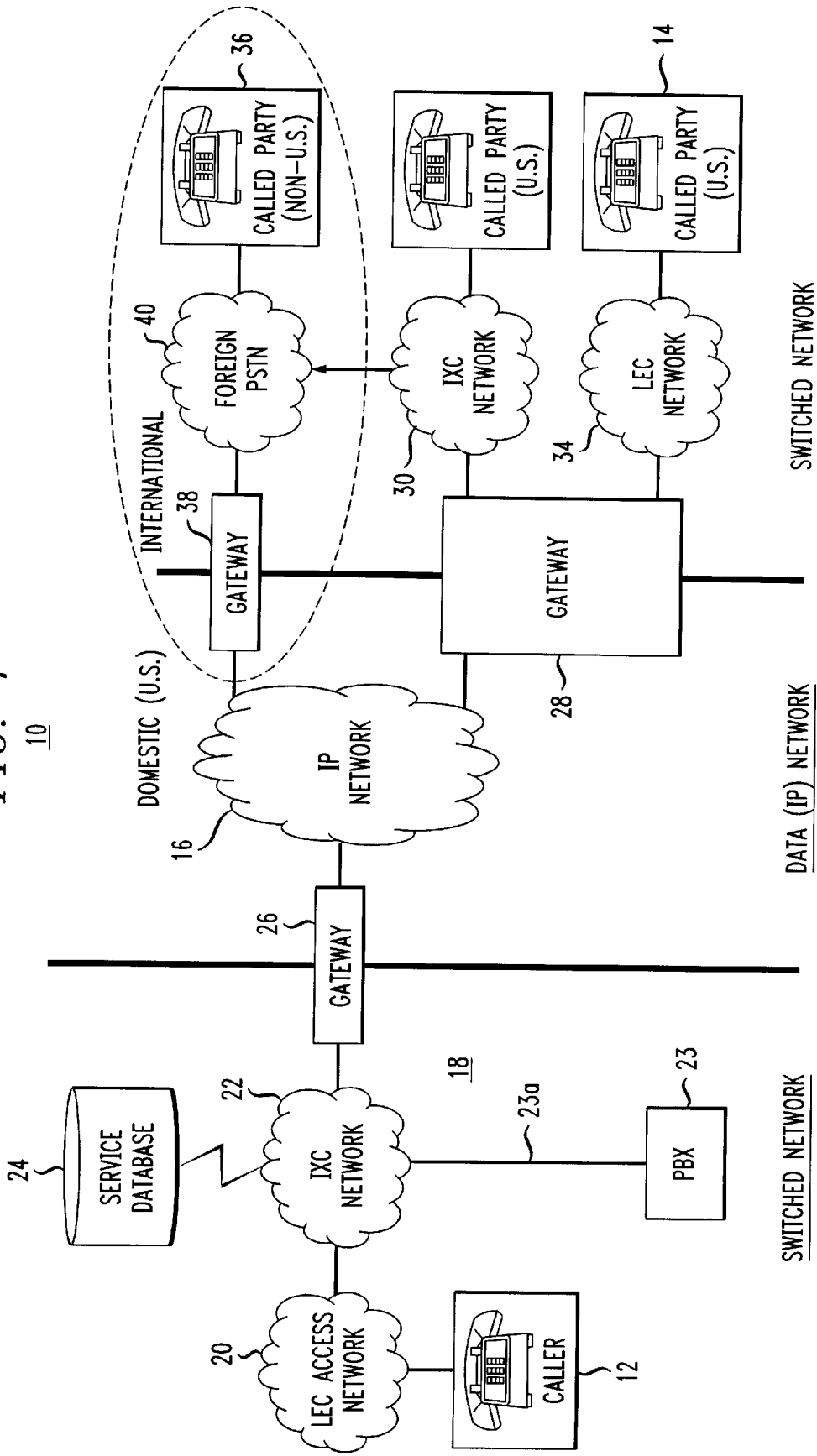
FIG. 1 shows a block schematic diagram of a network for practicing the method of the invention.

FIG. 1 depicts a block schematic diagram of a network 10 for routing a call (either voice, fax, voice-band data but not pure data) initiated by a caller 12 to a called party 14 over an IP network 16 that may include the public Internet, one or more private IP networks (sometimes referred to as intranets), or any combination thereof. The network 10 includes first switched network 18, typically a Public Switched Telephone Network (PSTN) that includes a Local Exchange Carrier (LEC) network 20, and an Inter-Exchange Carrier (IXC) network 22 such as that maintained by AT&T. The LEC network 20 provides the calling party 12 with local service (i.e., dial tone), whereas the IXC network 22 carries Inter-LATA as well as certain intra-LATA toll calls to and from the LEC network. Additionally, the IXC network 22 may provide certain business customers, represented by a Private Branch Exchange 23, with direct access through one or more trunk groups, such as trunkgroup 23a. In this way, a business customer may directly initiate an IXC call through the PBX 23 without the call first passing to the LEC 20.

Associated with the IXC network 22 is a service database 24 that contains a plurality of data records, each identified by an attribute of an incoming call received at the IXC network. The call attribute may comprise all or at least a portion of the originating number of the calling party 12 (as obtained by ANI). Rather than comprise the originating number, the call attribute could comprise all, or at least part, of the dialed destination number of the called party 14. Alternatively, the attribute could comprise a Carrier Identification Code dialed either explicitly, or implicitly, by the calling party. (Even though the calling party 12 did not actually dial a CIC with the code, the LEC 20 network will typically associate the CIC of the IXC 24 for calls routed from the LEC to that IXC network for pre-subscribed subscribers.)

Alternatively, a predefined trunkgroup designation, such as the designation of the characteristics of trunk group 23a, could comprise the record-identifying attribute such that all calls arriving on this trunkgroup are given IP Network routing. This arrangement could exist when an IXC receives calls from a business, represented by PBX 23, over a "private line" or dedicated trunkgroup, e.g., trunkgroup 23a, with the intention of providing IP Network routing. In this way, the network matches the trunkgroup record by comparing the trunkgroup characteristics to the database record having such an identifier. Thus, based on the incoming trunkgroup, the IXC network 22 can determine from the routing instructions in the matching database record whether the call should enjoy IP Network routing.

Indeed, the call attribute may comprise a combination any two or more of the following: (1) all or part of the originating number, (2), all or part of the destination number (3), the CIC, and (4) at least one trunkgroup characteristic. In accordance with the invention, each record in the service database 24 identified by a corresponding call attribute contains routing instructions for the call, and particularly, an instruction to route the call over the IP network 16 if possible.

To facilitate IP network 16 call routing, the network 10 includes an originating gateway 26 coupled to the IP network 16. The originating gateway 26 receives calls (either voice, fax or voice-band data) from the IXC network 22 and converts each such call into an Internet Protocol (IP) call for routing over the IP network 16. As indicated, the IP network 16 could comprise the public Internet, private IP networks (sometimes referred to as intranets), or some combination thereof which could either be dedicated or shared across many services. A destination gateway 28, also coupled to the IP network 16, converts an IP call received at that gateway from the Internet Protocol back to a voice-band call for routing over an IXC network 30 to a LEC 34 serving the called party 14. In the illustrated embodiment of FIG. 1, the IXC network 30 and IXC network 22 are depicted as separate entities. However, a single IXC network could transport a voice call to the originating gateway 26 from the LEC 20 for routing over the IP network 16 and could carry the call from the destination gateway 28 to the LEC 34.

As depicted in FIG. 1, the destination gateway 28 serves a domestic called party 14. An IP call destined for a foreign called party 36 will pass from the IP network 16 to a foreign gateway 38 that converts the IP call back to a voice-band call. A foreign PSTN 40 carries the call from the foreign gateway 38 to the foreign called party 36. In some instances, the foreign caller 36 may not be served by a foreign gateway, such as gateway 38. Under such circumstances, the call passes via the IP network 16 to a domestic destination gateway, such as gateway 28, for receipt by an IXC, such as IXC 30, that possesses a link to the foreign PSTN 40.

IP Network 16 call routing in accordance with the invention occurs in the following manner. A calling party, say calling party 12, seeking to place a call to the called party 14 dials the number of the called party. The call dialed by the calling party 12 initially passes to the LEC 20. Assuming the dialed number is not within its serving area, the LEC 20 routes the call to the IXC network 22 either through carrier presubscription or in accordance with the explicitly entered CIC code. Upon receipt of the call, the IXC network 22 accesses the service database 24 to determine whether the database contains any record that is identified by one or more attributes associated with the call. If there is a record identified by at least one call attribute, the IXC network 22 examines the record to determine if the record contains a routing instruction specifying Internet call routing. If so, IXC network 22 routes the call over the IP network 16. In the absence of any database record, the IXC network 22 routes the call in a default manner, typically over the network's own communication paths, rather than the IP Network 16 although, in some instances default routing may include routing over the IP network.

As discussed above, the call attributes that serve to identify the records in the service database 24 include one or more of the following: (1) all or part of the originating number, (2), all or part of the destination number (3), the CIC, and (4) the trunkgroup characteristics. For instance, those subscribers of the IXC network 22 that desire IP network 16 telephone service each have a corresponding record stored in the database 24 identified by subscriber's telephone number. The record contains instructions that specify IP network 16 call routing for calls from the subscriber's number. Thus, when an Internet telephony subscriber (e.g., the calling party 12) initiates an Inter-LATA (or even an Intra LATA toll) call, the IXC network 22, upon receiving that call will access the service database 24 to obtain the record identified by the subscriber's telephone number. Since the subscriber is an Internet telephony subscriber and desires IP network 16 routing for originating calls, the service database record 24 will specify such routing, thus instructing the IXC network 22 to route calls over the IP network 16.

As indicated, the database record-identifying attribute could comprise all or part of the destination number. For example, the IXC network 22 could offer default IP network 16 routing for all calls except those directed to destination numbers that are not served by a corresponding destination gateway, say gateway 28. Thus, upon receipt of a subscriber's call, the IXC network 22 accesses the service database 24 obtain the corresponding record if any identified by the destination number or portion thereof. Upon accessing the record, the IXC network 22 follows the routing instructions in the record, and will route the call over the IP network 16 when record so specifies.

The record-identifying attribute could simply comprise a particular CIC. Presently different IXCs have one or more unique CICs. For example, the CICs 10288 and 10732 are used by AT&T. A LEC, such as LEC 20, that receives a call having a CIC of 10288 or 10732 pre-pended to the destination number must route the call to AT&T as the IXC. Along with the call, the LEC 18 also passes the CIC to the recipient IXC network 22. The LEC 18 will pass the CIC automatically for subscriber pre-subscribed to the IXC although the caller actually didn't dial the CIC code. In this way, the IXC network 22 receives the CIC implicitly, rather than explicitly.

Just as a subscriber can presently choose a particular IXC, such as AT&T, for completing a call by dialing the appropriate CIC, a subscriber can select IP network 16 call routing for a particular call in accordance with the invention by pre-pending a prescribed CIC to the call to request Internet routing. Thus, a subscriber, not presently pre-subscribed to the IXC network 22 can nevertheless achieve IP network call routing by pre-pending the appropriate CIC code to the call. The subscriber does not, therefore, have to change its selected IXC. Upon receipt of a call containing the prescribed CIC, the LEC 20 passes the call to the IXC network 22 which, in turn, accesses the service data base 24 to find the record matching the caller-entered CIC. Assuming such a record exists, the network 22 obtains the routing instructions associated with the record and routes the call over the IP network 16 when the record so specifies.

As discussed, the call attribute may comprise a combination any two or all of the following: (1) all or part of the originating number, (2), all or part of the destination number and (3), the CIC, and (4) the trunkgroup characteristics. For example, the record-identifying attribute may include a combination of the originating number and all or part of the destination number, the latter indicating the availability of a destination gateway, such as the destination gateway 28, serving the called party. Alternatively, the record-identifying attribute may include a combination of a prescribed CIC and all or part of the destination number.

A major advantage of the IP network call routing scheme of the invention discussed above is its ability to afford IP network call routing without the attendant need for multistage dialing as required previously. A subscriber need only dial a destination number to achieve IP network call routing as discussed above.

In practice, the IXC network 22 does not route pure data calls over the IP network 16 in the manner described for voice-band calls because conversion of a pure data call to an IP call could adversely affect the call. Thus, it may be desirable for the IXC network 22 to first screen calls destined for Internet routing to determine if the call is a voice, facsimile, or voice-band data call. To that end, the IXC network 22 would possess appropriate mechanisms, as are known in the art, to perform such screening.

The above-described embodiments are merely illustrative of the principles of the invention. Those skilled in the art may make various modifications and changes, which will embody the principles of the invention and fall within the spirit and scope thereof. For example, while the preferred embodiment of the invention contemplate an IXC network for routing calls from a LEC to an Internet gateway, the LEC could accomplish that function directly, provided the LEC possessed the ability to access the service database 24 or its equivalent.

What is claimed is:

1. A method for selectively routing a telephone call over at least one IP Network automatically from an originating number to a destination number in accordance with at least one attribute of the call, comprising the steps of:

receiving in a non-IP network a call initiated by a subscriber;

accessing a database upon receipt of a call to locate a routing instruction record identified by at least one attribute of the call, examining the record to determine whether the call should be routed over the one IP network; and if so, screening the call itself to determine whether the call should be formatted as a Voice-over IP call, and if so, then formatting the call as a Voice over IP call; and routing the call over said IP Network.

2. The method according to claim 1 wherein the call attribute comprises at least a portion of the originating number.

3. The method according to claim 1 wherein the call attribute comprises at least a portion of the destination number.

4. The method according to claim 1 wherein the call attribute comprises a Carrier Identification Code (CIC) associated with the network originating the call.

5. The method according to claim 1 wherein the call is received at the network on a trunkgroup and wherein the call attribute includes a characteristic of said trunkgroup.

6. The method according to claim 1 wherein the call attribute comprises a combination of at least two of the following: (1) at least a portion of the originating number, (2) at least a portion of the destination number, (3) a Carrier Identification Code (CIC) associated with the network originating call; and, and (4) a characteristic of a trunk group carrying the call to the network.

7. The method according to claim 6 wherein the call attribute comprises the combination of at least a portion of the originating number and at least a portion of the destination number.

8. The method according to claim 6 wherein the call attribute comprises the combination of at least a portion of the destination number and the CIC.

9. The method according to claim 1 wherein the network provides default call treatment by routing the call through the IP network in the absence of a database record.

10. The method according to claim 9 wherein the network provides default call treatment by routing the call over network communications channels that do not include the IP Network.

* * * * *